United States Patent
Espindola et al.

[11] Patent Number: 6,111,999
[45] Date of Patent: Aug. 29, 2000

[54] FIBER DEVICE HAVING VARIABLE REFRACTIVE INDEX REGION PROXIMAL THE CORE

[75] Inventors: Rolando Patricio Espindola, Chatham, N.J.; Jefferson Lynn Wagener, Aberdeen, Wash.; Robert Scott Windeler, Cllinton, N.J.

[73] Assignee: Lucent Technologies Inc., Murray Hill, N.J.

[21] Appl. No.: 09/159,435

[22] Filed: Sep. 24, 1998

[51] Int. Cl.⁷ .................................................. G02B 6/34
[52] U.S. Cl. ............................ 385/37; 385/10; 385/12; 385/124
[58] Field of Search .................................. 385/37, 27, 6, 385/12, 10, 122, 123, 124, 140

[56] References Cited

U.S. PATENT DOCUMENTS

| | | | |
|---|---|---|---|
| 5,864,641 | 1/1999 | Murphy et al. | 385/12 |
| 6,011,886 | 1/2000 | Abramov et al. | 385/37 |
| 6,021,240 | 2/2000 | Murphy et al. | 385/37 |

*Primary Examiner*—Phan T. H. Palmer
*Attorney, Agent, or Firm*—Mathews, Collins, Shepherd & Gould, P.A.

[57] ABSTRACT

A device for changing the power levels of signals transmitted by an optical fiber, along with signal modulation and wavelength routing, comprises a length of optical fiber in which for a predetermined section of the length of the fiber, the fiber core is surrounded by a cladding having one or more variable refractive index (VRI) regions disposed therein in close proximity to the core. A grating region is disposed along the length of the fiber overlapping the VRI region. The VRI regions have an index of refraction lower than that of the core to change the effective index of the guided light and thereby define a tunable grating.

21 Claims, 3 Drawing Sheets

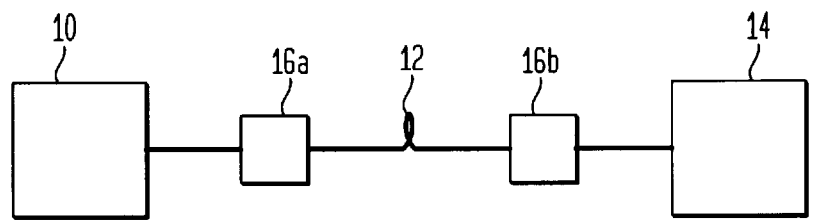
FIG. 1A
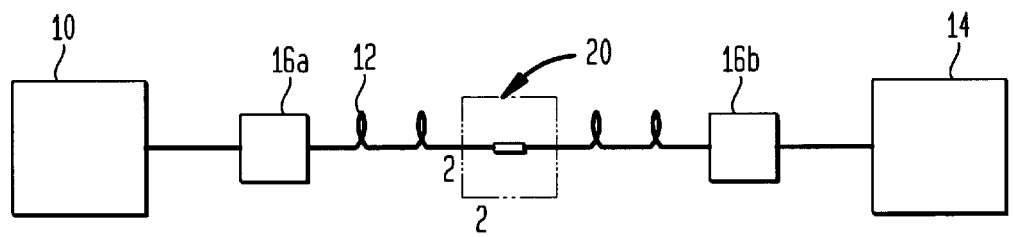
FIG. 1B
FIG. 2
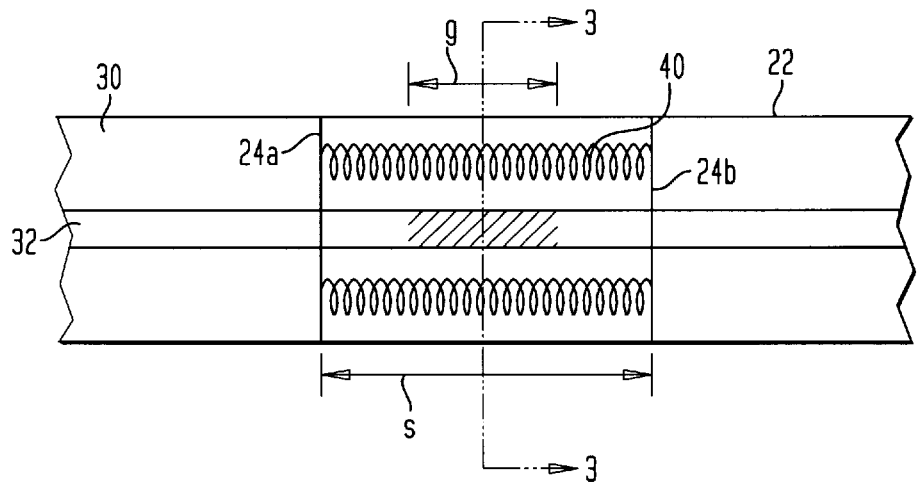

FIBER DEVICE HAVING VARIABLE REFRACTIVE INDEX REGION PROXIMAL THE CORE

RELATED APPLICATIONS

This application is related to U.S. application Ser. No. 09/160,779, filed concomitantly herewith, titled "Fiber Device Having Variable Refractive Index Region Proximal the Core," by the same inventive entity herein and assigned to the present assignee.

FIELD OF THE INVENTION

The present invention relates to fiber structures having one or more variable refractive index regions adjacent the core for index modulation. The fiber structure is particularly useful for tuning fiber filters including Bragg gratings and long-period gratings of optical communications systems.

BACKGROUND OF THE INVENTION

Optical fibers are well known in the art and useful for many applications in modern communications systems. A typical fiber optic communications system, for example, is shown schematically in FIG. 1A, comprising a source of optical signals 10, a length of optical fiber 12 coupled to the source, and a receiver 14 coupled to the fiber for receiving the signals. One or more amplifying systems 16a, 16b, may be disposed along the fiber for amplifying the transmitted signal. Filters are useful in these systems to change the power levels of various signals, especially in wavelength division multiplexed systems, along with signal modulation and wavelength routing.

Basically, the optical fiber 12 shown in FIG. 1A comprises an inner core fabricated from a dielectric material having a certain index of refraction, and a cladding surrounding the core. The cladding is comprised of a material having a lower index of refraction than the core. As long as the refractive index of the core exceeds that of the cladding, a light beam propagated along the core exhibits total internal reflection, and it is guided along the length of the core. Since in the conventional optical fiber, light is confined mostly in the core region, the ability to externally effect propagation behavior of the light in the fiber is significantly limited. With conventional fibers, to change the propagation behavior of light in the core, one is essentially limited to the application of strain and/or temperature changes to the fiber.

Optical fiber gratings including Bragg and long-period gratings are important elements for selectively controlling specific wavelengths of light within an optical fiber. A typical Bragg grating comprises a length of optical fiber including a plurality of perturbations in the index of refraction substantially equally spaced along the fiber length. These perturbations selectively reflect light of wavelength $\lambda$ equal to twice the spacing $\Lambda$ between successive perturbations, i.e. $\lambda = 2n_{eff}\Lambda$, where $\lambda$ is the vacuum wavelength and $n_{eff}$ is the effective refractive index of the propagating mode. Light of the selected wavelength $\lambda$ is reflected back to point of origin, and the remaining wavelengths pass essentially unimpeded. Such Bragg gratings are useful in a variety of applications including filtering, stabilizing semiconductor lasers, reflecting fiber amplifier pump energy, and compensating for fiber dispersion.

Bragg gratings in optical fibers are conveniently fabricated by providing a fiber having a core doped with one or more materials sensitive to ultraviolet light, such as a fiber having a core doped with germanium oxide, and then exposing the fiber at periodic intervals to high intensity ultraviolet light from an excimer laser. The ultraviolet light interacts with the photosensitive dopant to produce perturbations in the index of refraction. The appropriate periodic spacing of the perturbations to achieve a conventional grating can be obtained by use of a physical mask, a phase mask, or a pair of interfering beams.

A difficulty with conventional fiber Bragg gratings is that they filter only a fixed wavelength. Each grating selectively reflects light in only a narrow bandwidth centered around $\lambda = 2n_{eff}\Lambda$. However, in many applications, such as multiplexing, it is desirable to have a grating whose wavelength response can be tuned, that is, controllably altered. A tunable fiber grating has been attempted with use of a piezoelectric element to strain the grating. See Quetel et al., 1996 Technical Digest Series, *Conf. on Optical Fiber Communication,* San Jose, Calif., Feb. 25–Mar. 1, 1996, Vol. 2, p. 120, paper No. WF6. However, the strain produced by piezoelectric actuation is relatively small, limiting the tuning range of the device. Moreover, piezoelectric activation requires a continuous application of relatively high voltage, e.g., approximately 100 volts for 1 nm strain. Another approach for providing a tunable Bragg grating involves use of thermally-induced strain on the fiber, as described in U.S. application Ser. No. 08/957,953, "*Device for Tuning Wavelength Response of an Optical Fiber Grating,*" filed Oct. 27, 1997 by Fleming et al. (the '953 application), and assigned to the present assignee, which is incorporated herein by reference. The '953 application involves use of a temperature-sensitive body attached to the exterior of the optical fiber adjacent the Bragg grating region.

Long-period fiber grating devices provide wavelength dependent loss and may be used for spectral shaping. A long-period grating couples optical power between two copropagating modes with very low back reflections. A long-period grating typically comprises a length of optical fiber wherein a plurality of refractive index perturbations are spaced along the fiber by a periodic distance $\Lambda$ which is large compared to the wavelength $\lambda$ of the transmitted light. In contrast with conventional Bragg gratings, long-period gratings use a periodic spacing $\Lambda$ which is typically at least 10 times larger than the transmitted wavelength, i.e. $\Lambda \geq 10\lambda$. Typically $\Lambda$ is in the range 15–1500 micrometers, and the width of a perturbation is in the range $\frac{1}{5}\Lambda$ to $\frac{4}{5}\Lambda$. In some applications, such as chirped gratings, the spacing $\Lambda$ can vary along the length of the grating.

Long-period fiber grating devices selectively remove light at specific wavelengths by mode conversion. In contrast with conventional Bragg gratings in which light is reflected and stays in the fiber core, long-period gratings remove light without reflection by converting it from a guided mode to a non-guided mode. A non-guided mode is a mode which is not confined to the core, but rather, is defined by the entire waveguide structure. Often, it is a cladding mode. The spacing $\Lambda$ of the perturbations is chosen to shift transmitted light in the region of a selected peak wavelength $\lambda_p$ from a guided mode into a nonguided mode, thereby reducing in intensity a band of light centered about the peak wavelength $\lambda_p$. Alternatively, the spacing $\Lambda$ can be chosen to shift light from one guided mode to a second guided mode (typically a higher order mode), which is substantially stripped to provide a wavelength dependent loss.

Long-period grating devices are thus useful as filtering and spectral shaping devices in a variety of optical communications applications. Each long-period grating with a given periodicity ($\Lambda$) selectively filters light in a narrow bandwidth centered around the peak wavelength of coupling, $\lambda_p$. This wavelength is determined by $\lambda_p(n_c-n_{cl}) \cdot \Lambda$, where $n_g$ and $n_{ng}$ denote the effective index of the core mode and the cladding mode, respectively. The values of $n_c$ and $n_{cl}$ are dependent on the relative values of the refractive indices of the core, cladding, and air. A difficulty with conventional long-period gratings, however, is that their capability to equalize amplifier gain is limited, because they filter only a fixed wavelength acting as wavelength-dependent loss elements. Thus, there is a need for a long-period grating whose transmission spectrum can be controlled. It is desirable to have a tunable (or reconfigurable) long-period grating which, upon activation, can be made to dynamically filter other wavelengths (i.e., besides $\lambda_p$) Further, it is desirable to be able to selectively filter a broad range of wavelengths, e.g., for efficient operation of multiple-channel WDM in telecommunication systems. A recent device for providing a tunable long-period grating is described in U.S. application Ser. No. 08/957,956, "Tunable Long-Period Grating Device and Optical Systems Employing Same," filed Oct. 27, 1997 by Jin et al. (the '956 application), and assigned to the present assignee, which is incorporated herein by reference. The '953 application involves use of a strain-inducing body secured to the fiber adjacent the grating region for changing the spacing between the perturbations of the grating.

As may be appreciated, those concerned with the development of optical communications systems and, more particularly fiber devices, continually search for new components and fiber designs. As optical communications systems become more advanced, there is growing interest in increasing the number of wavelengths that may be transmitted by the systems and therefore in new methods and devices for modulating, filtering, and switching wavelength channels. The instant invention provides a new structure for a tunable optical fiber device, including a tunable Bragg or long-period grating device, that does not involve complicated structures or application of strain to the fiber.

SUMMARY OF THE INVENTION

Summarily described, the invention embraces a tunable fiber device for use in a optical communications system comprising a length of fiber having a core fabricated with a material having a certain refractive index; a cladding surrounding the core with a refractive index less than the refractive index of the core; a grating region with periodic or quasi-periodic perturbations along a predetermined section of the length of the fiber; and at least one variable refractive index (VRI) region disposed within the cladding adjacent the grating region and in close proximity to the core. The VRI region has a refractive index lower than that of the core to modify the effective index of the mode propagated along the core. In modifying the effective index of the guided mode, the VRI region changes the wavelength filtered by the grating region and thereby provides a tunable grating device.

BRIEF DESCRIPTION OF THE DRAWINGS

For a better understanding of the invention, an exemplary embodiment is described below, considered together with the accompanying drawings, in which:

FIG. 1A shows a schematic illustration of an optical communications system;

FIG. 1B is a schematic illustration of an optical communications system including the inventive device;

FIG. 2 shows a cross-sectional view of one embodiment of an inventive fiber grating device taken along the length;

Figure 3A:
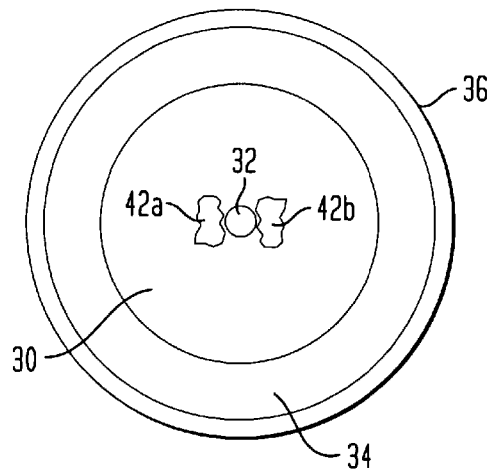
FIGS. 3A, 3B, and 3C show cross-sectional views of alternate embodiments of the inventive fiber device, taken along a cross-sectional width following the line 3—3 of FIG. 2.

It is to be understood that these drawings are for the purposes of illustrating the concepts of the invention and are not to scale.

DETAILED DESCRIPTION OF THE INVENTION

Referring to FIG. 1B, it will be appreciated that the inventive device 20 may comprise part of an optical fiber communication system that further comprises elements such as a transmitter 10, a receiver 14, and an optical path 12 connecting transmitter and receiver, with one or more amplifiers 16a, 16b, disposed along the optical path. The device 20 may be placed at select regions of the optical path, and one or more devices 20 can be used in the optical system. FIG. 2 shows the device 20 in further detail providing an exploded, cross-sectional view at boxed region 2—2 of FIG. 1B.

Referring to FIG. 2, applicants have discovered that a fiber optic device useful for modifying the mode of light propagation can be fabricated by providing a length of fiber 22 where a predetermined section of the fiber, "s", contains one or more variable refractive index (VRI) regions 40. This section of the fiber "s" will be referred to herein as the VRI section. By "variable refractive index region" it is meant that this region 40 is comprised of a material having a refractive index different than that of the core or the cladding and whose refractive index is capable of being varied either internally or externally, e.g., the "internal" variation comprising a variation occurring due to a change in the length, shape, or size of the VRI or due to a gradient over the width or length of the device such as with use of different concentrations of dopants, and the "external" variation comprising a variation occurring as a function of parameters such as time, temperature, or externally applied electric or magnetic fields.

Also, along the length of the fiber there is disposed a predetermined section containing a grating region "g." At the grating region there are periodic or quasi-periodic perturbations within the core comprising a Bragg or long-period grating, as described above and as are known in the field. The grating region and the VRI region are positioned adjacent each, e.g., overlapping along the width of the fiber, for at least a portion of each of these regions. Although in FIG. 2 the device is shown where the VRI region is longer than and spans the width of the grating region and beyond, the opposite configuration may be used, that is, the length of the grating region "g" may be longer than and extend beyond the length of the VRI region. Other configurations are also possible, e.g., the regions may be substantially equal in length and overlap in an essentially complementary or coinciding fashion, which is preferred, or they may be staggered, the important consideration being that they overlap to at least some degree.

The length of the fiber that does not include the VRI section is referred to herein as the standard fiber section. The interface regions where the VRI section is joined with the standard fiber section are referred to herein as the first and second connections 24a, 24b. The VRI region 40 is disposed in the cladding 30 of the fiber in close proximity to the core 32. By "close proximity to the core" it is meant that at least a portion of at least one VRI region is sufficiently close to the core so that light is guided from the core into the VRI region. Preferably, the distance from the center of the fiber to the outer edge of the VRI region proximal the core is less than or equal to one mode field diameter, which is known in the field. The distance "close proximity to the core" advantageously may be determined given that parameter. The VRI region changes the properties of the grating region and the wavelength of light filtered thereby, which may be modified or varied with appropriate selection of the materials used to fabricate the VRI region.

The VRI region or regions may initially comprise air or holes which may later be filled with material of choice, or they may be doped with materials having different refractive indices than either the core or the cladding. Also, the VRI regions may have variable concentrations of dopants or be doped with different materials along their cross-sections to produce gradients of increasing or decreasing refractive indices. Dopants may include one or more of Ge, Al, B, P, Ga, La, and rare-earth dopants as described in U.S. Pat. No. 4,666,247 to MacChesney et al., "Multiconstituent Optical Fiber," issued May 19, 1987 (the '"247 patent"), assigned to the present assignee, which is hereby incorporated by reference. The degree of wavelength tuning effected by the VRI region may be controlled by altering the materials comprising the VRI region, by changing the length of the VRI section, by using temperature-sensitive materials or polymers for fabricating the VRI region and heating or cooling the fiber, by fabricating the VRI region with an electro-optic or magneto-optic material and applying an electric or magnetic field preferably adjacent the VRI section (e.g., with electrodes placed at the exterior of the fiber), or with use of other materials or methods for altering the index of the VRI region in the range from below the index of the core to near or below the index of the cladding. The VRI regions can be fabricated with materials that otherwise could not be incorporated within the fiber when drawn; in other words, materials that are unavailable for fabricating the cladding regions may be used to fabricate the VRI regions, which allows for a wide choice of material dispersion with these regions. Preferably, the refractive index of the VRI region is not identical to the index of the cladding or the core.

In operation, if the VRI region has an index the same as that of the cladding, there is essentially no effect. The connections 24a, 24b may cause a small amount of insertion loss, but this loss is negligible, i.e., about less than 0.5 dB. The refractive index of the VRI should be kept lower than the refractive index of the core so that there is only one guided mode throughout the device; the refractive index of the VRI region may be below the index of the cladding. When the refractive index of the VRI is at least below that of the core, the effective index of the guided light (the reduction in the speed at which the light is transmitted in the fiber as compared with in a vacuum) is low. As the refractive index of the VRI region is raised, the effective index of the guided light is raised. Since the properties of the grating (e.g., the center wavelength filtered by the grating) are dependent on the effective index of the guided light, the wavelengths filtered by the grating will change as the refractive index of the VRI region is changed. When the refractive index of the VRI region is raised uniformly over a VRI section that corresponds in length to the length of the grating section, the center wavelength of the grating may shift. When the refractive index of the VRI region is raised or varied in a skewed, non-uniform manner over at least part of the length of the grating section, not only may the center wavelength of the grating shift but there also may be a chirp induced on the grating, changing the width and dispersion properties of the light guided by the fiber. As noted above, the degree of wavelength filtering may be altered by varying the constituents comprising the VRI regions. The inventive fiber device is thus advantageous for producing a tunable grating and is also advantageous for exhibiting little or no birefringence.

Figure 3B:
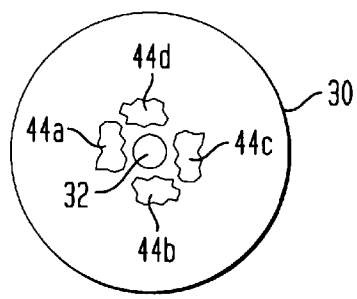
Figure 3C:
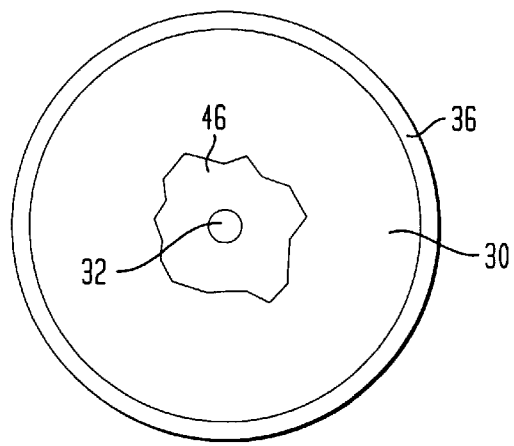

Referring to FIGS. 3A through 3C, there are shown cross-sectional views of alternative embodiments of the inventive device, taken along the width at the cross-sectional line 3—3 of FIG. 2. The length of fiber has a core 32, surrounded by at least a first cladding layer 30. The core should be comprised of a material having a relatively high index of refraction, for example, a $SiO_2$:$GeO_2$ core may be used, with $GeO_2$ being added to raise the refractive index. The index may also be raised with use of dopants, as previously discussed with reference to the VRI region and described in the '247 patent. The inner cladding 34 is comprised of a material having a lower index of refraction than the core, and may be undoped silicate glass.

An optional second cladding 34 may surround the first inner cladding 30. Thus, the refractive indices of the layers would become progressively less moving from the core to the second cladding 34. However, use of a second cladding layer is not needed to practice this invention. A substantially circular outer polymer layer 48 optionally may be used if desired to protect the fiber.

Within the inner cladding 34, adjacent the core 32, there are disposed one or more VRI regions 40. It is important that at least one of the variable refractive index regions be located in close proximity to the core, as defined above. The VRI regions may be formed in various shapes and have varying thicknesses, depending also on the dimensions of the fiber. The regions need not be symmetrical which is advantageous as this relaxes the processing conditions. Generally, VRI regions shaped substantially as circles or disks (e.g., as pie wedges with no "points"), are preferred as this eases the manufacturing steps. Preferably, more than two VRI regions are used so that there are no distinctly different axes located 90 degrees apart, as this reduces the likelihood of there being fundamental mode birefringence associated with the VRI regions. Manufacturing the inventive fiber device with a plurality of regions (e.g., from three to six or more) around the core is not substantially more difficult than making the device with just two VRI regions.

For example, the VRI regions may comprise essentially one or more amorphous rods 42a, 42b, as shown in FIG. 3A, on either side of the core 32. Alternatively, the regions may comprise a plurality of substantially non-circular isolated regions 44a, 44b, 44c, 44d, suspended within the cladding 30, as shown in FIG. 3B. In yet another embodiment, the VRI region may comprise a substantially non-circular region 46 concentrically surrounding the core as in FIG. 3C. The VRI regions can be amorphous, without any clearly defined shape, thereby avoiding manufacturing difficulties associated with obtaining a particular configuration.

Figure 4:
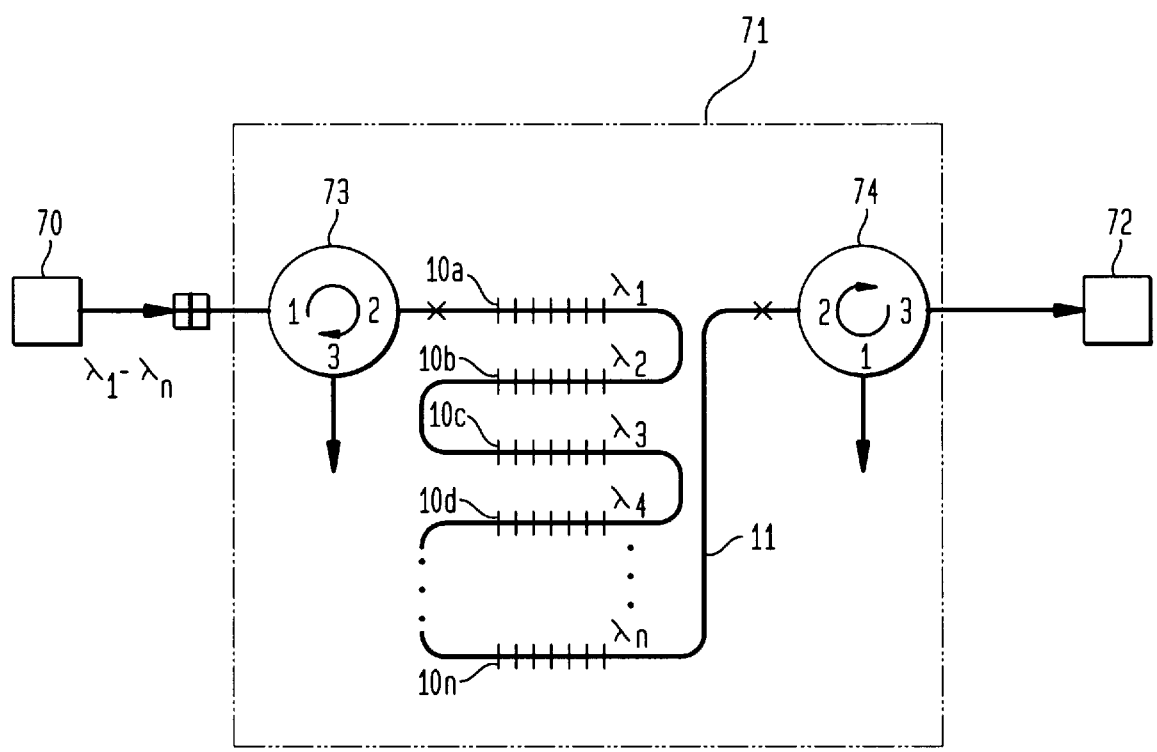
FIG. 4 illustrates an application of the invention comprising an N channel add/drop WDM communication system with two circulators and one or more gratings according to the invention.

The VRI regions can be produced by selective diffusion or implantation of dopants in the cladding, applying doping techniques known in the field. These regions also may be fabricated with materials that are responsive to electric or magnetic fields or temperature, such as liquid crystals or certain polymers, and then the refractive indices of the VRI regions may be adjusted by selectively applying magnetic or electric fields or heating or cooling the fiber. A straightforward method of making the optical fiber device comprising the VRI section involves providing a portion of a fiber having a Bragg or long period grating region and holes disposed along its length adjacent the core in the area of the grating. Refractive index oil, such as oil manufactured by Cargille Inc. of Cedar Grove, N.J., or other liquid materials may be easily drawn into the holes by capillary action. Alternatively, if capillary action is not sufficient to draw the liquid into the holes, a vacuum pump may be used. In either case, a section of the holes adjacent the interfaces 24a, 24b preferably should be left hollow to ease the process of joining the VRI section to the standard fiber section. When a solid refractive index material is used to form the VRI region, preferably the VRI is formed during the processing of the fiber itself It will be appreciated that the inventive device may be used in a variety of applications and optical communications systems, such as wavelength division multiplexer/ demultiplexer devices including devices with ADD/DROP functionality. The tunable grating device may be coupled to a wavelength device and feedback system such that the tuning of the device may be automatically controlled 18. For example, FIG. 4 illustrates one such application of the invention comprising an N channel add/drop wavelength-division multiplexed (WDM) communication system with two circulators and one or more inventive gratings. The WDM communications system comprises a transmitter 70, an improved N-channel multiplexer/demultiplexer within boxed region 71, and a receiver 72, all connected by trunk fiber 11. The input to the fiber 11 from the source 70 consists of optical signals at several wavelengths, $\lambda_1$ to $\lambda_n$. The improved multiplexer 71 comprises one or more pairs (one pair is shown) of circulators 73, 74, comprising at least one upstream circulator 73 and a downstream circulator 74. A series of inventive gratings (10a, 10b, 10c, 10d, . . . 10n), are placed between the circulators. One or more of the optical grating devices 10a . . . 10n may be activated to drop or add communication channels of selected wavelengths, $\lambda_1, \lambda_2, \lambda_3, \lambda_4, \ldots$ to $\lambda_n$.

It will be understood that the embodiments described herein are merely exemplary and that a person skilled in the art may make variations and modifications without departing from the spirit and scope of the invention. All such variations and modifications are intended to be included within the scope of the appended claims.

We claim:

1. An article including an optical fiber device, the device comprising:
    a length of optical fiber having a core fabricated with a material having a predetermined refractive index, a grating in the core, and a cladding surrounding the core having a refractive index less than the refractive index of the core; and
    at least one variable refractive index (VRI) region disposed within the cladding in close proximity to the core for a predetermined section of the length of optical fiber adjacent the grating, the VRI region having a refractive index lower than that of the core for modifying the effective index of the light propagated along the core and thereby tune the grating.

2. The article of claim 1, wherein the grating comprises a Bragg grating.

3. The article of claim 1, wherein the grating comprises a long-period grating.

4. The article of claim 1, in which a plurality of VRI regions are disposed within the cladding.

5. The article of claim 1, in which the refractive index of the at least one VRI region varies from above the refractive index of the cladding to less than the refractive index of the core.

6. The article of claim 1, further comprising a second cladding layer surrounding the cladding having a refractive index different from that of the cladding.

7. The article of claim 1, further comprising an outer polymer layer for protecting the length of optical fiber.

8. The article according to claim 1, in which the at least one VRI region is comprised of a temperature-sensitive material so that the refractive index of the VRI region may be controlled by heating or cooling the device.

9. The article according to claim 1, in which the at least one VRI region is comprised of an electro-optic or magneto-optic material so that the refractive index of the VRI region may be controlled by applying a magnetic or electric field to the device.

10. The article according to claim 1, in which the at least one VRI region is comprised of doped glass.

11. The article according to claim 10, in which the concentration of dopants is varied within the VRI region to define one or more refractive index gradients.

12. The article according to claim 1, in which the at least one VRI region comprises a hole within the cladding substantially filled with refractive index oil.

13. The article according to claim 1, in which the distance between the center of the core and the at least one VRI region is approximately less than or equal to one mode field diameter.

14. An N-channel optical ADD/DROP multiplexer/ demultiplexer comprising a plurality of optical circulators and a plurality of optical fiber gratings interconnected by an optical fiber, wherein at least one of the plurality of optical gratings comprises a tunable optical grating device according to claim 1.

15. An optical fiber device for tuning the wavelength response of an optical fiber filter, the device comprising:
    an optical fiber section comprising a core fabricated with a material having a predetermined refractive index, a cladding surrounding the core having a refractive index less than the refractive index of the core, a grating region in the core, and at least one variable refractive index (VRI) region disposed within the cladding in close proximity to the core, the VRI region having a refractive index lower than that of the core for modifying the effective index of the light guided by the core to thereby change the wavelength response of the optical fiber.

16. The device of claim 15, in combination with a means for varying the refractive index of the VRI region.

17. The device of claim 15, in which the grating region comprises a Bragg grating.

18. A method of tuning an optical fiber filter having a grating region, the method comprising the steps of:
    providing a tunable grating device comprising a core fabricated with a material having a predetermined refractive index, a cladding surrounding the core having a refractive index less than the refractive index of the core, a grating region in the core, and at least one variable refractive index (VRI) region disposed within the cladding in close proximity to the core adjacent the grating region, the VRI region having a refractive index less than that of the core for modifying the effective index of the light guided by the core to thereby change the wavelength response of the optical fiber filter; and
    varying the refractive index of the VRI region to control the wavelength response of the optical fiber filter.

19. The method of claim 18, in which the step of varying the refractive index of the VRI region comprises providing a VRI region including a electro-optic or magneto-optic material and applying an electric or magnetic field to the device to alter the refractive index of the crystal.

20. The method of claim 18, in which the step of varying the refractive index of the VRI region comprises adjusting the size, shape or location of the VRI region.

21. The method of claim 18, in which the step of varying the refractive index of the VRI region comprises providing a VRI region including a temperature-sensitive material and changing the temperature of the device to alter the refractive index of the temperature-sensitive material.

* * * * *